Jan. 13, 1925.
W. SCHRAMM
1,523,085
EGG BEATER
Filed Aug. 24, 1923
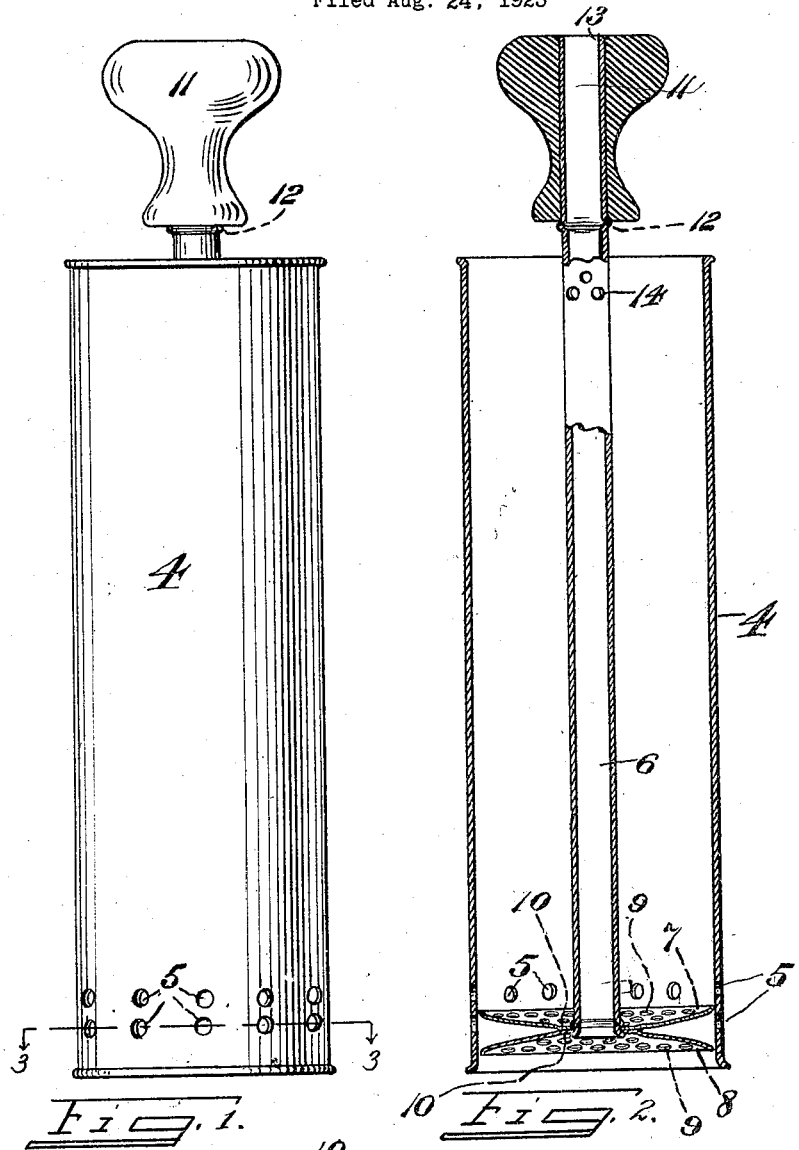
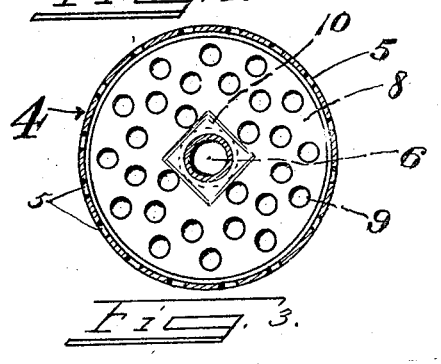
INVENTOR:
William Schramm,
BY John Elias Jones,
ATTORNEY.

Patented Jan. 13, 1925.

1,523,085

UNITED STATES PATENT OFFICE.

WILLIAM SCHRAMM, OF CINCINNATI, OHIO.

EGG BEATER.

Application filed August 24, 1923. Serial No. 659,130.

*To all whom it may concern:*

Be it known that I, WILLIAM SCHRAMM, a citizen of the United States of America, and a resident of Cincinnati, in the county of Hamilton and State of Ohio, have invented a certain new and useful Improvement in Egg Beaters, of which the following is a specification.

This invention relates to devices that are on the order of a dasher milk-churn but having improved air-impressing structures to accelerate the desired air-impregnated results in the use of eggs, cream and the like for food purposes, other than butter to which the said milk-churn is especially adapted.

My invention consists of a vertical, tubular or cylindrical barrel or open-ended container having air-inlets at its lower end, an axial vertical hollow stem or rod having a number of air-inlets near its upper end, a pair of superposed perforated beater or dasher disks mounted at the lower end of the said stem or rod, and a handle surmounting the upper hollow end of said stem or rod for manipulating the dasher-disks in a vertically-reciprocating manner, up-and-down, within the said tubular barrel or container, whereby the operation of beating or whipping eggs, cream and the like in said container is facilitated to the best possible advantage and thus assure speedy and permanent results, all of which will be specifically described in connection with the accompanying sheet of drawings, in which—

Figure 1 is an elevation of my improved egg-beater and cream-whip, showing it as it appears when at rest, ready for a supply of material to be agitated or worked upon; Fig. 2, a vertical axial section of the device, as it appears in Fig. 1, but with part of the manipulating hollow stem or rod in broken elevation; and Fig. 3, a sectional plan, taken on the dotted-line 3, 3, of Fig. 1, between the two dasher-disks.

4 indicates the hollow cylindrical or tubular barrel or open-ended container or receptacle for holding the supply of material to be beaten or whipped into the desired frothy form or foam consistency, the lower end or bottom of which is set on the upper face of the bottom of the vessel that is used to break the eggs in, or to pour the cream in, as the case may be, for drawing upward into the frothing or foaming device that constitutes my invention herein and which I will now proceed to describe in its working form.

The lower end of the barrel 4 is provided with a double row or circumferential series of perforations 5 for the entrance of air into the barrel, to accompany the supply of material to be worked upon.

6 is an axial hollow stem or rod arranged, when the parts of my device herein are assembled, in central vertical alignment within the barrel or cylinder 4, and having at its lower end a pair of dasher-disks 7 and 8, the latter being dished or flared toward each other when mounted in place, as best shown in Fig. 2, and having perforations 9 made in them for the simultaneous circulation of air and the material to be acted upon therethrough in the vertical reciprocations of the stem or rod in said cylinder and while held upright within the bowl or vessel in which the operation of frothing or foaming is conducted. It will be seen that the centers of said dasher-disks are somewhat spread out or flattened, as shown at 10 in each disk, and the extreme lower end of the said stem 6 is spread out or clinched into firm fastening or connecting place in said flattened centers, free from wabbling or loosening.

11 is a suitable manipulating knob or handle surmounting the hollow upper end of the said stem or rod 6 that is hollow from top to bottom, throughout its length, such stem being beaded at 12 to prevent the knob from slipping downwardly and with the upper entrance to its bore flared outwardly or clinched at 13 to prevent said knob moving from attached-place.

The said hollow stem 6 is provided with a number of holes or perforations 14 just below its beaded portion 12 to supply air-venting at that point in the operation of the dasher-disks below, especially when the said disks are in their vertical reciprocal movements within the barrel 4 above the lower air-inlets 5, to sustain or maintain the required air-impregnating supply at all times.

The handle is used to manipulate the dasher mechanism vertically, up-and-down, within the cylinder or barrel 4, till the egg is well and thoroughly beaten to the desired consistency, it being possible to beat or work upon a single egg, if need be, in the device, which has not been ordinarily practicable or possible with devices of this character. It is thus seen that it is the ample and continuous supply of air that acts on the material at all times in the reciprocations of the dasher-disks within the open-ended cylinder or barrel 4, and effects the result desired.

The perforations in the dasher-disks are provided to allow as much air as possible to enter the egg or cream supply in the cylinder for a rapid and thorough beating or foaming and frothing operation.

To remove the foamed or beaten product from the cylinder, all that is required is to lift the device from the vessel, then holding it upright in one hand and finally move the dasher up and down several times and blowing down the hollow stem or rod, thus liberating the said foamed product into said vessel from which it is taken for use. The blowing down the said stem serves to keep it clean before the egg or milk product has a chance to dry or harden therein.

I claim:—

In a device of the character described, the combination of a vertical lidless and bottomless, open-ended hollow cylinder having a plurality of perforations or air-inlets provided therein near its lower end, a hollow open-ended tubular stem axially-arranged within the said cylinder and pierced with a plurality of perforations or air-inlets somewhat below its upper end, a pair of contiguously-arranged or superposed concavo-convex dasher-disks pierced with a plurality of perforations and mounted at the open lower end of said hollow open-ended stem, and a handle or knob having a vertical central bore for securing-engagement with the said upper end of the hollow stem but somewhat above the level of the said upper air-inlets therein and adapted for reciprocally-moving the said closely-associated pair of dasher-disks within the said open-ended hollow cylinder whereby the operation of beating or whipping eggs, cream and the like is effected and facilitated, in a speedy and thorough manner, substantially as shown and described.

WILLIAM SCHRAMM.